(12) United States Patent
Meyer

(10) Patent No.: US 6,434,720 B1
(45) Date of Patent: *Aug. 13, 2002

(54) METHOD OF CHECKING DATA INTEGRITY FOR A RAID 1 SYSTEM

(75) Inventor: James W. Meyer, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/251,954

(22) Filed: Feb. 17, 1999

Related U.S. Application Data

(63) Continuation of application No. 08/880,251, filed on Jun. 23, 1997, now Pat. No. 5,953,352.

(51) Int. Cl.$^7$ ................................................ H04L 1/08
(52) U.S. Cl. ............................................................ 714/820
(58) Field of Search ................................ 714/819, 824, 714/769–770, 758

(56) References Cited

U.S. PATENT DOCUMENTS

| | | | |
|---|---|---|---|
| 4,639,921 A | 1/1987 | Gang et al. ................ 714/807 |
| 4,979,108 A | 12/1990 | Crabbe, Jr. ................ 709/106 |
| 5,138,710 A | 8/1992 | Kruesi et al. ............... 714/15 |
| 5,257,391 A | 10/1993 | DuLac et al. ............... 710/10 |
| 5,261,058 A | 11/1993 | Squires et al. ............... 710/1 |
| 5,280,487 A | 1/1994 | Bergkvist .................. 714/297 |
| 5,323,403 A | 6/1994 | Elliott ....................... 714/757 |
| 5,379,417 A | 1/1995 | Lui et al. ................... 713/300 |
| 5,388,108 A | 2/1995 | DeMoss et al. ............... 714/6 |
| 5,412,666 A | 5/1995 | Squires et al. ............. 714/755 |
| 5,418,925 A | 5/1995 | DeMoss et al. ............ 711/114 |
| 5,471,640 A | 11/1995 | McBride ..................... 710/22 |
| 5,487,160 A | 1/1996 | Bemis ....................... 711/114 |
| 5,542,065 A | 7/1996 | Burkes et al. ............. 711/114 |
| 5,546,558 A | 8/1996 | Jacobson et al. .......... 711/114 |
| 5,548,712 A | 8/1996 | Larson et al. ................. 714/7 |
| 5,553,230 A | 9/1996 | Peterson et al. ............. 714/1 |
| 5,592,618 A | 1/1997 | Micka et al. ................ 714/54 |
| 5,629,949 A | 5/1997 | Zook ........................ 714/769 |
| 5,724,368 A | 3/1998 | Zook ........................ 381/71.1 |
| 5,778,206 A | 7/1998 | Pain et al. ................ 710/129 |
| 5,799,022 A | 8/1998 | Williams .................. 714/797 |
| 5,953,352 A * | 9/1999 | Meyer ...................... 714/820 |
| 6,058,462 A * | 5/2000 | West et al. ................ 711/162 |
| 6,062,822 A * | 5/2000 | Meyer ...................... 714/758 |
| 6,125,469 A * | 9/2000 | Zook et al. ................ 714/769 |

OTHER PUBLICATIONS

Nebus, James F., "Parallel Data Compression for Fault Tolerance," *Computer Design*, Apr. 5, 1983, pp. 127–134.

Patterson, David, et al., "A Case for redundant Arrays of Inexpensive Disks (RAID)," University of California Report No. UCB/CSD 87/391, Dec. 1987, pp. 109–116.

Patterson, David, et al., "Introduction to Redundant Arrays of Inexpensive Disks (RAID)," Compcon '89: 34$^{th}$ IEEE Computer Society International Conference held in San Francisco, Feb. 27, 1989, pp. 112–117.

* cited by examiner

*Primary Examiner*—Albert DeCady
*Assistant Examiner*—Shelly A Chase
(74) *Attorney, Agent, or Firm*—Knobbe Martens Olson & Bear LLP

(57) ABSTRACT

A method of checking data integrity in a computer system which includes the acts of: transmitting primary data from a primary device to a primary CRC circuit; transmitting secondary data from a secondary device to a secondary CRC circuit, wherein the primary data and the secondary data are transmitted to their respective CRC circuits concurrently; generating a primary CRC value; generating a secondary CRC value, wherein the primary and secondary CRC values are generated concurrently; and comparing the primary CRC value with the secondary CRC value in order to generate a compare value.

21 Claims, 5 Drawing Sheets

METHOD OF CHECKING DATA INTEGRITY FOR A RAID 1 SYSTEM

This application is a continuation of application Ser. No. 08/880,251 filed Jun. 23, 1997 entitled METHOD OF CHECKING DATA INTEGRITY FOR A RAID 1 SYSTEM, now U.S. Pat. No. 5,953,352.

FIELD OF THE INVENTION

The present invention relates to disk storage devices for computer systems and, more particularly, to a method and system for providing a fast and efficient comparison of cyclic redundancy check (CRC)/checksum values of two mirrored disks in a RAID level 1 system.

BACKGROUND OF THE INVENTION

Dramatic increases in computer processing power and speed, and in the speed and capacity of primary memory devices, have been realized in recent years. Unfortunately, in contrast to processing and main memory technology advances, the rate of improvement in performance of secondary memory storage devices, primarily magnetic disks, has been modest. The benefits from the substantial gains and performance in speed which continue to be realized for CPUs and main memory devices will not be fully realized if not matched by similar performance increases in secondary storage devices. For example, as the mismatch in performance of CPU and disk memory increases, disk I/O operations consume a greater proportion of the CPU operating time.

Disk arrays have been proposed as a means to improve the performance of secondary storage devices, eliminating the expensive mismatch between CPU and secondary storage performance. A disk array, comprising a multiplicity of small, inexpensive disk drives connected in parallel, appears as a single, large disk to the host system. In many applications disk arrays offer improvement in performance, reliability, power consumption and scalability over a single large magnetic disk.

Current disk array design alternatives are described in an article titled "A Case for Redundant Arrays of Inexpensive Disks (RAID)" by David A. Patterson, Garth Gibson and Randy H. Katz; University of California Report No. UCB/CSD 87/391, December 1987. This article describes five disk array arrangements, referred to as RAID levels. The simplest array system, a RAID level 1 system, comprises one or more disks for storing data and an equal number of additional "mirrored" disks for storing copies of the information written to the data disks.

Mirrored disk arrangements are typically used in PC server applications where mission critical data is involved. A mirrored disk arrangement typically includes a primary disk and a secondary disk which holds an exact copy of the contents of the primary disk and is used in case of a failure of the primary disk. It is necessary in this type of disk configuration to guarantee that the contents of the primary and secondary disks are identical.

Prior art RAID 1 implementations used a serialized approach to accessing the contents of these mirrored disks. Each disk's contents were accessed separately in order to verify the contents of each. With the advent of new controller technology along with the adoption of the EIDE standard, more parallelism in disk access is possible. This enables a hardware oriented approach to verify the contents of the primary and secondary disks and leads to noticeable system improvement in latency and throughput. New controller architectures, such as the SYM89C621 by Symbios Logic, allow concurrent operation of the primary and secondary IDE channels. With these enabling features, more verification is possible in the same amount of time as previous RAID 1 controllers which also leads to better system integrity.

The SYM89C621 is a dual channel bus mastering PCI enhanced IDE (EIDE) controller capable of supporting the fastest standard EIDE transfers, with flexibility that allows for support of future EIDE modes up to and exceeding 20 MB/s. The SYM89C621 is designed for use in PC, host board adaptor, and portable applications providing special features to meet the needs of each of these applications.

The SYM89C621 supports two independent EIDE channels with a separate EIDE data path for each channel. Other IDE controllers multiplex the IDE channels over one shared IDE databus. If more than 2 IDE devices are used without external logic this may cause signal integrity problems. In contrast to this type of design, the SYM89C621 provides complete support for two channels, without any external logic. This provides up to two times higher performance than shared channel devices. Shared data path designs cannot match the SYM89C621 for concurrent data transfer performance nor can they provide the same high quality signal reliability.

Although controllers such as the SYM89C621 have emerged to provide parallel access to two independent EIDE channels, there is no corresponding cyclic redundancy check (CRC), particularly for a RAID 1 system, for testing the data integrity of two mirrored disks, which takes advantage of this new parallel access technology. Thus, there is a need for a system or circuit for performing data integrity checks between two mirrored disks which takes advantage of the parallelism in disk access which is currently possible. Such a system, or circuit, will lead to greater reliability and throughput and faster data accesses by a computer system.

Typically, the term "CRC" means an operation in which a dataword, or other segment of data, is inserted into a polynomial function and then truncated in order to detect single or multi-bit errors. The term "checksum" typically refers to the operation of cumulatively adding successive data segments, or datawords, and truncating the result in order to detect errors. However, as used herein, the terms "cyclic redundancy check," "checksum," "CRC", "CRC calculation," "checksum calculation," and conjugations thereof, are used synonymously and interchangeably and refer to any algorithm, or mathematical operation, for performing data integrity checks which are well-known in the industry.

SUMMARY OF THE INVENTION

The present invention addresses the above and other needs by providing a hardware implemented compare circuit which simultaneously and concurrently receives data blocks from each of the mirrored disks in a dual channel IDE controller architecture.

As used herein, the term "simultaneously," or any conjugation thereof, is synonymous with the term "concurrently," and means that two processes or steps may occur at the same time as the other. It does not necessarily imply that the two or more processes, or steps, are dependent upon the occurrence of the other. In other words, two processes are said to be concurrently occurring if they have overlapping periods of time in which they are taking place. It is not necessary that the start and the end of one process occur at the same time as that of the other. In order to convey temporal dependence between two or more processes, or steps, the term "synchronization," or any conjugate thereof, is used herein, e.g., "step 1 is synchronized with step 2."

In one embodiment of the invention, a method of checking data integrity in a computer system, includes: transmitting primary data from a primary device to a primary CRC circuit; transmitting secondary data from a secondary device to a secondary CRC circuit, wherein the primary data and the secondary data are transmitted to their respective CRC circuits concurrently; generating a primary CRC value; generating a secondary CRC value, wherein the primary and secondary CRC values are generated concurrently; and comparing the primary CRC value with the secondary CRC value in order to generate a compare value.

In another embodiment, a method of checking the integrity of data used in a computer system, includes: transmitting primary datawords on a primary channel to a primary CRC circuit; transmitting secondary datawords on a secondary channel to a secondary CRC circuit wherein each primary dataword is transmitted concurrently with a corresponding secondary dataword; generating a new primary CRC value for each primary dataword; generating a secondary CRC value for each secondary dataword; comparing each primary CRC value with a corresponding secondary CRC value; and generating a compare value of "true" if each primary CRC value is identical to the corresponding secondary CRC value, otherwise, generating a compare value of "false." In a further embodiment, the method as described above further includes: synchronizing the transmission of primary datawords to a primary CRC circuit with a feedback of primary CRC values to the primary CRC circuit; and synchronizing the transmission of secondary datawords to a secondary CRC circuit with a feedback of secondary CRC values to the secondary CRC circuit.

In yet another embodiment, the method as described above further includes: storing the compary value in a storage register; and synchronizing the storing of the compare value such that the compare value is stored only after a specified number of primary and secondary datawords have been transmitted to their respective CRC circuits and a last primary and secondary CRC value has been compared.

DETAILED DESCRIPTION OF THE INVENTION

Mirrored disk configurations are used throughout the PC industry especially with network server class machines. In network configurations, it is very important to maintain data integrity as well as performance. This invention strives to provide both. This invention will simultaneously calculate a CRC or checksum on the data that is moved from each mirrored disk and then provide a comparison status of two disks. The simultaneous reading of data from each of the mirrored channels and calculation of CRC or checksum values provides increased data throughput over prior IDE controllers which performed these operations for one channel at a time. Additionally, previous IDE controllers did not have the compare circuitry built into them. Instead they relied on software to compare the data between the mirrored disks. Software is inherently slower than a hardware implementation because it must perform extra CPU and memory cycles to compare the data moved from each disk.

In an IDE controller having a primary channel and a secondary channel, each channel receives a dataword from one of two mirrored disks. A CRC/checksum calculation is then performed on each dataword and the result is stored in respective accumulation registers for each channel of the IDE controller. Upon receiving the next dataword, each channel performs a CRC/checksum calculation by implementing a predetermined CRC algorithm. In one embodiment, each new dataword is combined with the previously calculated CRC value using XOR gates to implement a specific polynomial function in order to produce a new CRC/checksum value. However, it should be understood that this invention is not limited to any specific CRC or checksum algorithm but may include any one of numerous data integrity algorithms which are well-known in the art. In one embodiment, a dataword is a 16-bit dataword, which is an industry standard. However, datawords having lengths greater than or less than 16-bits may be used in the present invention. As used herein, the term "dataword" refers to any unit of data being a specified number of bits in width, such as, 16-bits or 32-bits.

Figure 1:
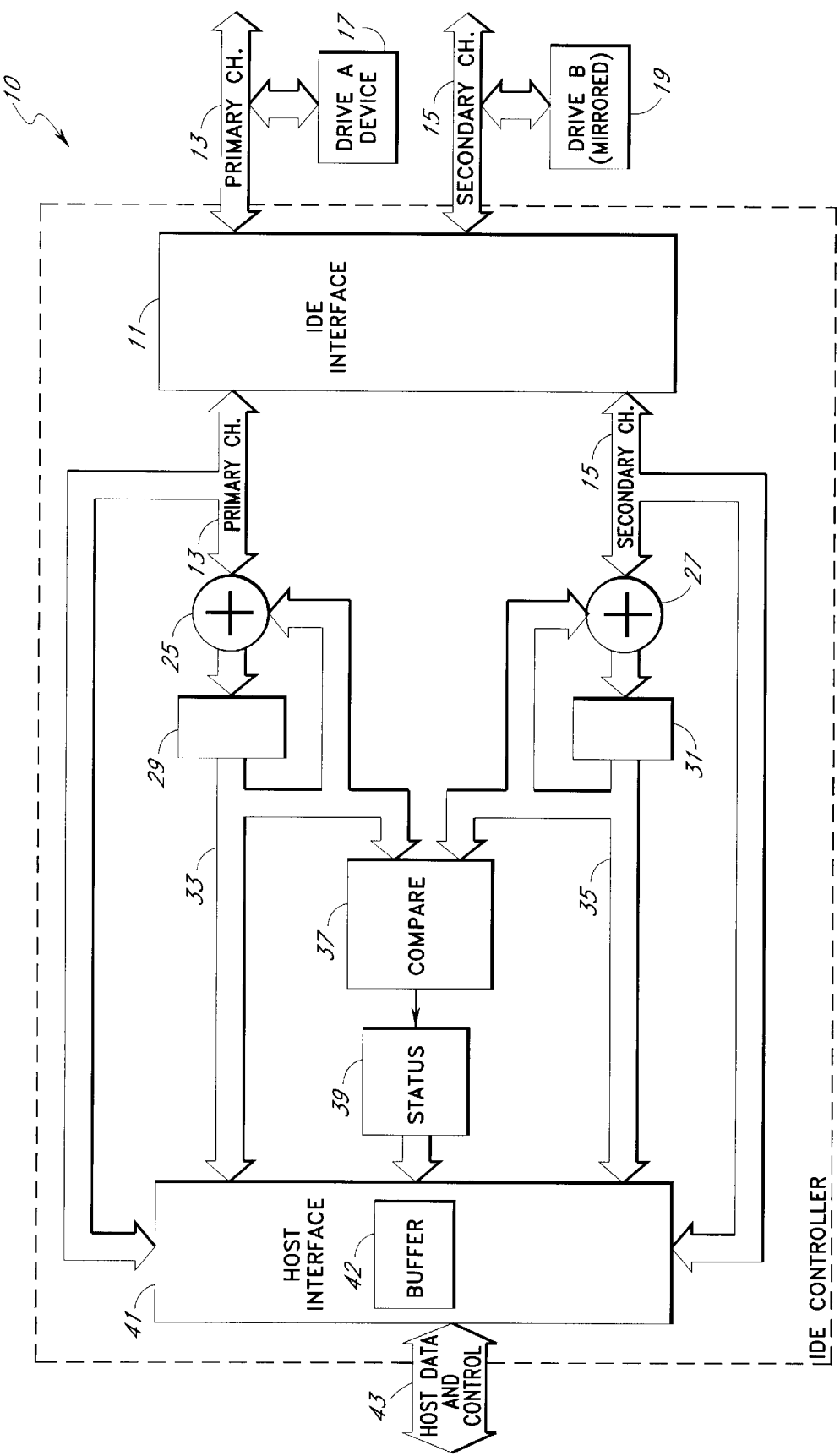
FIG. 1 is a block diagram of an IDE controller compare circuit capable of receiving and transmitting data from/to a primary drive and receiving and transmitting data from/to a secondary drive in accordance with the invention.

Referring to FIG. 1 an IDE controller 10, in accordance with the present invention, is shown. The IDE controller 10 includes an IDE interface 11 having a primary IDE channel 13 and a secondary IDE channel 15. A first drive 17 is shown coupled to the primary IDE channel 13 and a second drive 19 is shown connected to the secondary IDE channel 15. Primary data is transmitted on the primary channel 13 to a primary CRC circuit 25 and secondary data is transmitted on the secondary channel 15 to a secondary CRC circuit 27. The primary CRC circuit 25 and the secondary CRC circuit 27 each have an output to an accumulation register 29, 31, respectively. These accumulation registers 29, 31, store the intermediate values of the CRC/checksum calculations performed on each dataword received by the respective CRC/checksum circuits 25, 27. As will be described in further detail below, the outputs of the accumulation registers 29 and 31 are fed back to their respective CRC circuits 25, 27 to provide feedback signals that can then be used in performing the CRC/checksum algorithm for the next dataword transferred to the CRC/checksum circuit 25, 27.

The outputs of the accumulation registers 29, 31 are also communicated to a compare circuit 37 which compares the CRC/checksum values stored in the accumulation registers 29, 31 and outputs a value of "true" if the comparison indicates an identical match between the values. Otherwise, a "false" value is generated by the compare circuit 37. The output of the compare circuit 37 is then transmitted to a status register 39 which stores the compare value when a synchronizing clock pulse is received.

The IDE controller 10 also includes a host interface 41 for storing the primary and secondary data 21, 23, in a buffer 42 within the host interface 41. The host interface 41 couples a host CPU (not shown) to the IDE controller 10 via a host data and control bus 43. The compare value generated by the compare circuit 37 is accessed by the host CPU via the host interface 41 and the host data and control bus 43. In response to receiving a "true" compare value from the host interface, the host CPU will then access all the data stored in the host interface buffer 42 via the host data and control bus 43 and store this data in a main memory of the system, e.g., a hard disk drive. On the other hand, if a "false" compare value is read by the host CPU, the host CPU will then initiate an error correction/analysis program, such as those found in popular network operating systems manufactured by Novell® or Digital Equipment Corp., in order to correct or discard the corrupted data. Such error correction/analysis programs are well known in the art.

Data may be transmitted between a host CPU and the IDE controller via programmed I/O (PIO) or via direct memory access (DMA). In the PIO mode, the host computer transmits a memory address and a read or write command to the respective drive, for each dataword which is being read from or written to the drive. These commands include the reading of status and error information, the setting of parameters and the writing of commands. It is called PIO because, in contrast to DMA, every access is individually programmed.

In the DMA mode, apart from the initial request, transfers may take place without intervention by the CPU. The CPU transmits "logical block addresses" to a respective drive it desires to access. These "logical block addresses" are then stored in task registers residing within the drive. After the "logical block addresses" are stored in the task registers of the respective disk drives, the CPU will then send a read command to each of the respective disk drives, at which point the IDE controller will initiate a transfer of all the data corresponding to the logical block addresses. In the DMA mode the IDE controller functions as a bus master ATA compatible (IDE) disk controller that directly moves data between the IDE devices and the main memory of the CPU. By performing the IDE data transfer as a bus master, the IDE controller off-loads the CPU (no programmed I/O for data transfer) and improves system performance in multitasking environments. This type of transfer mode is advantageous in multi-tasking systems because while one process waits for its I/O access to be completed, the CPU is free to do computations for other processes.

The allocation or designation of logical block addresses is implemented by a pointer which points to a Physical Region Descriptor Table located in the main memory of the system. This table contains some number of physical region descriptors (PRD) which describe areas of memory that are involved in the data transfer. The descriptor table is typically aligned on a four byte boundary and the table typically does not cross a 64 k byte boundary in memory. Before the IDE controller starts a master transfer, it is given the pointer to the PRD table. The physical memory region to be transferred is described by a PRD. Each physical region descriptor entry is typically eight bytes in length. The first four bytes specify the byte address of a physical memory region. The next two bytes specify the count of the region in bytes (64 k byte limit per region). A value of zero in these two bytes indicates 64 k bytes. Bit 7 of the last byte indicates the end of the table and the bus master operation terminates when the last PRD has been read. Thus, the data transfer proceeds until all regions described by the PRDs in the table have been transferred.

As should be apparent, although DMA transfers involve more work for the processor before and after each transfer, the processor is completely free during the transfer. Also, during the transfer of multiple sectors, an interrupt occurs only at the end of the entire transfer, not after each sector. This is especially advantageous in multitasking systems where the processor can utilize the time it gains through DMA.

After the logical block addresses have been stored in the task registers of the desired disk drives, the CPU sets the command register of the IDE controller to a read or write state. If the command register of the IDE controller is set to a read state, for example, the controller will begin transferring the data designated by the logical block addresses to the host interface 41.

Figure 2:
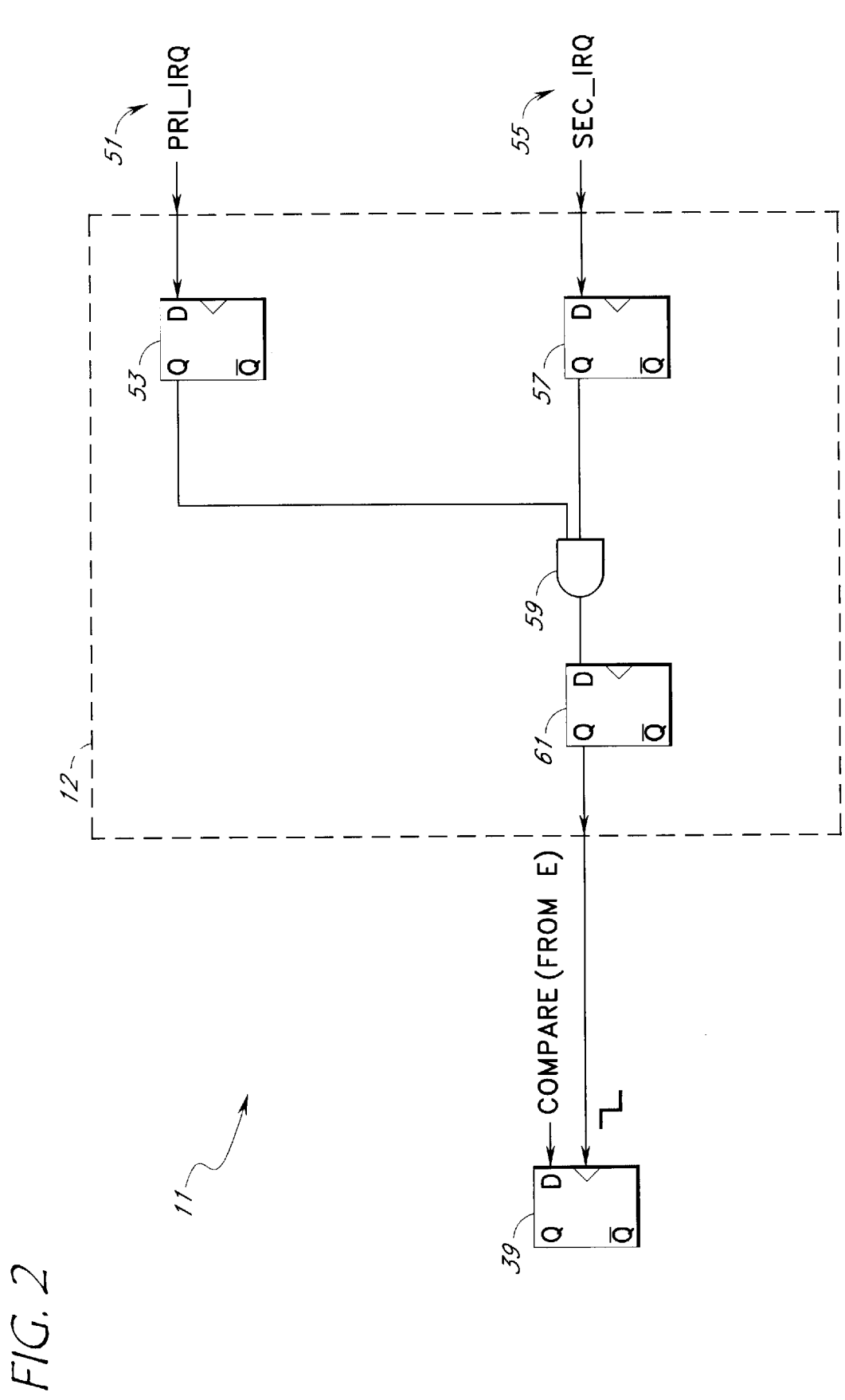
FIG. 2 is a block diagram of a synchronization circuit for the IDE controller compare circuit of FIG. 1 which synchronizes the transmission of data, the calculation of CRC values and then subsequent storage.

A synchronization circuit is needed to synchronize the transfer of data from both the primary and secondary IDE channels, 13 and 15, respectively, and to synchronize the CRC/checksum calculations performed on the data received from each channel, the storage of these checksum values, and finally the comparison of the checksum values calculated for the primary and secondary data. FIG. 2 shows an embodiment of a master synchronization circuit 12 which is used in the IDE controller of FIG. 1.

Referring to FIG. 2, after a predetermined number of data blocks (e.g., 512 bytes or 256 words) have been transmitted to the host interface 41 (FIG. 1), the first drive 17 (FIG. 1) transmits an interrupt signal, designated as PRI_IRQ, to the IDE interface and the second drive 19 (FIG. 1) transmits an interrupt, SEC_IRQ, to the IDE interface 11. The IDE interface 11 may include a D flip-flop 53 which captures the PRI_IRQ signal and another D flip-flop 57 which captures the SEC_IRQ signal. Since the speed and latency of each drive can vary from access to access, it cannot be determined which drive, primary or secondary, will finish its transfer first and thereafter generate the appropriate interrupt request signal (IRQ). Therefore, if the primary drive finishes its data transfer first, for example, it will generate the PRI_IRQ signal, which is usually a logic level high pulse, and transmit this signal to the input of D flip-flop 53. Likewise, if the secondary drive finishes its data transfer first, it will generate the SEC_IRQ signal and transmit it to the input of D flip-flop 57. The outputs of D flip-flop 53 and D flip-flop 57 are "anded" by AND gate 59. As is well known in the field of digital logic design, D flip-flops are designed to transmit whatever value is present at their inputs upon receiving a rising or falling edge of a clock signal at its clock input. As its name implies, the D (delay) flip-flop serves to delay the value of the signal at its input by one clock cycle. Digital logic must sometimes deal with input signals that have no fixed temporal relation to a master clock, such as the PRI_IRQ and SEC_IRQ signals of the present invention. One natural application of the D flip-flop is as a synchronizer of input signals.

The output of the AND gate 59 is connected to the D input of the D flip-flop 61, which has a Q output that serves as a clock pulse to the D flip-flop 39. The D flip-flop 39 is the status register 39 of FIG. 1. The synchronization of the storage of a compare value into status register 39, only after the completions of data transfer by both channels, is described in greater detail below with reference to FIG. 3.

Figure 3:
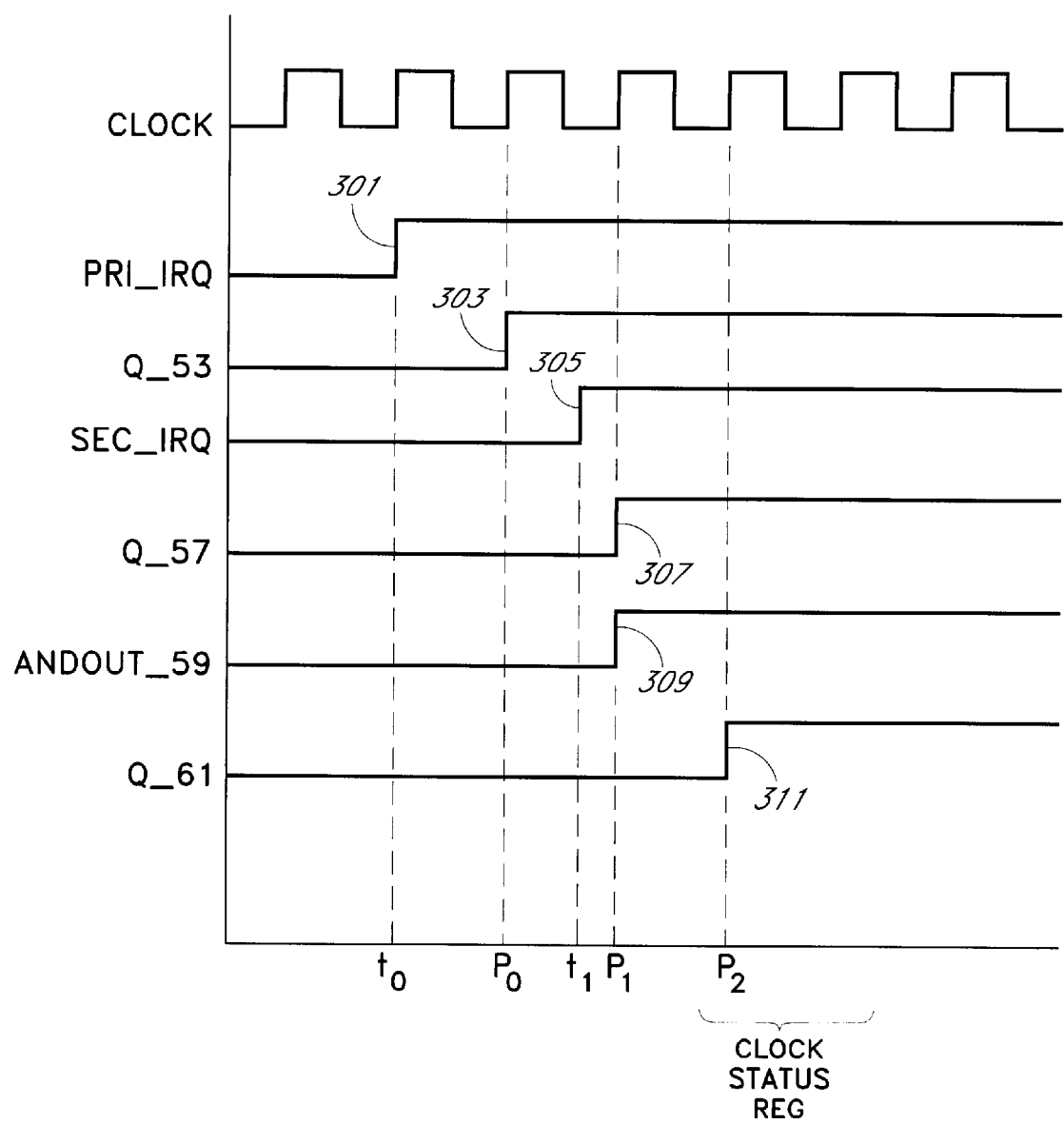
FIG. 3 is a timing diagram of the synchronization control signals which are propagated through the synchronization circuit of FIG. 2.

FIG. 3 shows a timing diagram of the signals propagated through the synchronization circuit 12 of FIG. 2. When the primary drive has finished transmitting all of the data corresponding to a single read command by the CPU, the primary drive 17 (FIG. 1) generates and outputs an interrupt signal, PRI_IRQ 51, and transmits this interrupt signal to the D flip-flop 53 of the IDE interface 11. As shown at 301 in FIG. 3, PRI_IRQ becomes active high at time $T_0$. Because of the characteristics of the D flip-flop the output of D flip-flop 53, Q_53, goes high at the next rising edge of the clock signal, at time $P_0$ as seen at 303. Similarly, when the secondary drive has completed the transfer of a predetermined block or sector of data in response to a read command by the host CPU, the secondary drive will output an interrupt signal, SEC_IRQ, to the IDE interface 11, at 305 which is time $T_1$. The signal SEC_IRQ 55 is received by D flip-flop 57 of the synchronization circuit 12 contained within IDE interface 11. After the SEC_IRQ signal 55 is received by D flip-flop 57 the output Q_57 of D flip-flop 57 will go high as seen at 307, on the next rising edge of the master clock signal, at time $P_1$. When Q_57 goes high, the two inputs of the AND gate 59 are high. Therefore, at time $P_1$ the output of AND gate 59 will go high as seen at 309. On the rising edge of the next clock cycle, at time $P_2$, the output Q_61 will go high as seen at 311. Therefore, we see that at 311 the signal Q_61 goes high, at time $P_2$, thereby providing a rising edge clock signal to status register 39 (FIG. 2).

At 311, on the rising edge of Q_61, the status register 39 stores the compare value at its input, after which this compare value may be accessed by a host CPU. Since the rising edge of Q_61 does not occur for at least one clock cycle after the signal SEC_IRQ has gone active high at time $T_1$, the master synchronization circuit 12 ensures that the compare value present at the input of the status register, D flip-flop 39, is not stored and made available to the host CPU until at least one clock cycle after both drives have completed transmitting the specified number of data blocks to the host interface 41 and have generated respective interrupt signals.

Figure 4:
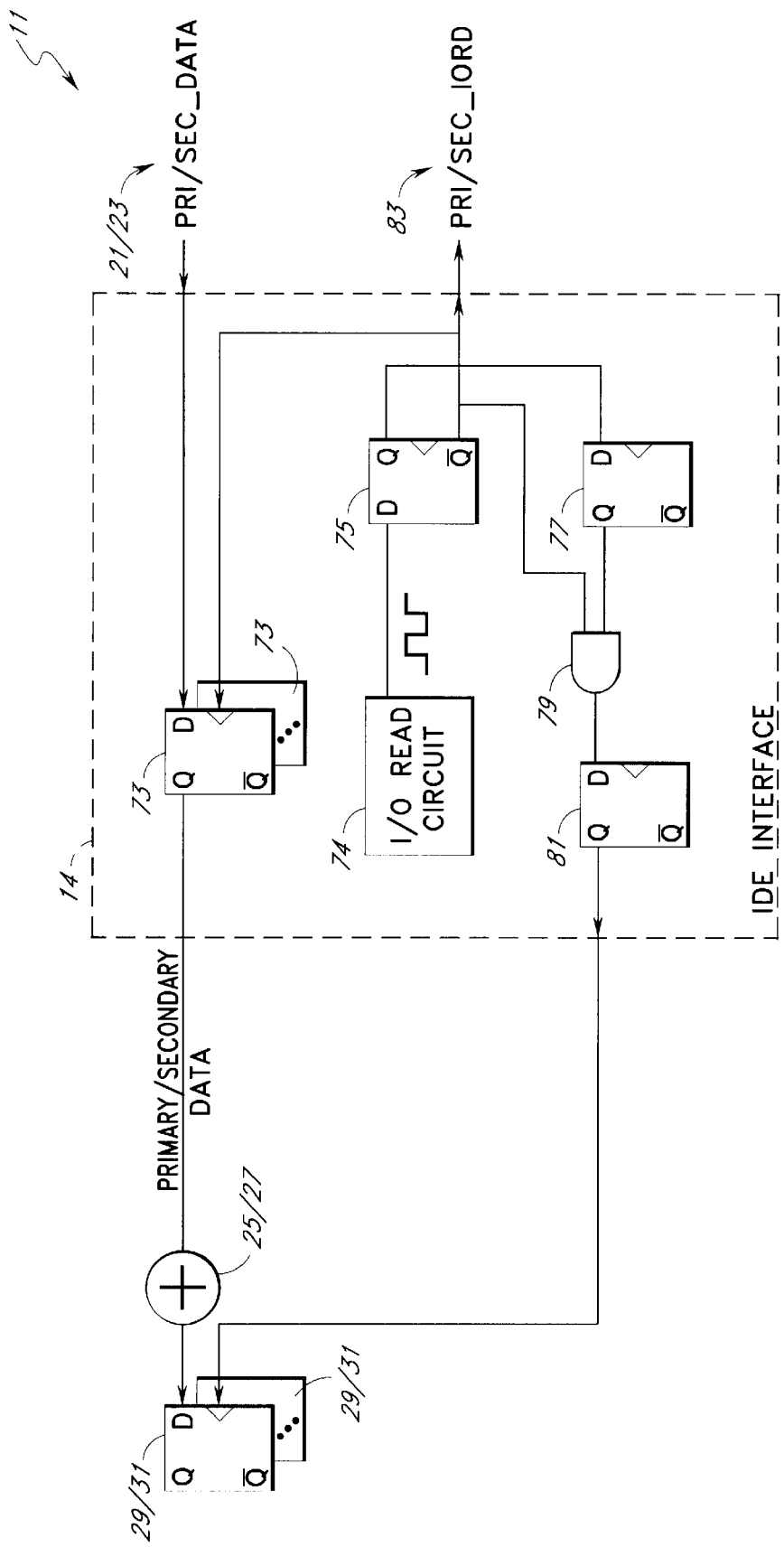
FIG. 4 is a block diagram of a synchronization circuit for the IDE controller compare circuit of FIG. 1 which synchronizes the operation of transmitting a new dataword to the CRC/checksum circuit, performing the checksum operation and storing the results in the respective accumulation register for each channel.

The synchronization of the primary and secondary CRC/checksum accumulation registers is also important for ensuring an accurate comparison by compare circuit 37. Each accumulation register must be clocked after a new dataword has been clocked in from the IDE interface. Referring to FIG. 4, each channel, primary 13 and secondary 15, contains a synchronization circuit 14 for synchronizing the operations of transmitting datawords to their respective CRC circuits, performing CRC/checksum calculations on each dataword, and subsequently clocking the checksum values into the respective accumulation registers, or D flip-flops 29, 31 (See FIG. 1). This synchronization is accomplished with control signals, such as PRI_IORD and SEC_IORD, which are generated by the synchronization circuit 14.

The following discussion will be directed toward the operation of the synchronization circuit 14 with respect to the primary IDE channel 13. However, it should be understood that the corresponding synchronization circuit 14 for the secondary IDE channel 15 operates in the same fashion as will be described with respect to the primary channel 13.

As shown in FIG. 4, a primary dataword is transmitted to the inputs of a set of D flip-flops 73. In one embodiment, the length of the dataword is 16 bits. Since each of the D flip-flops receives a single bit of the 16 bit primary dataword, there are 16 parallel D flip-flops 73 in the circuit of that embodiment. The frequency and number of datawords that are transmitted to the D flip-flops 73 is controlled by a control signal, typically an I/O pulse train, generated by an I/O read circuit 74. The I/O read circuit 74 begins generating a pulse train of specified pulse width and frequency upon receiving a read command signal from the host CPU (not shown). This pulse train is connected to the D input of D flip-flop 75. When the input of D flip-flop 75 is at a high logic level, the complimentary $\overline{Q}$ output is at a low logic level. As shown in FIG. 4, the $\overline{Q}$ output of flip-flop 75 functions as the primary I/O read signal, PRI_IORD, which is sent to the primary disk drive (FIG. 1) in order to initiate a read access. The PRI_IORD signal is active low such that when its value is at a low logic level, the primary disk drive will access a dataword from a specified memory location and place the dataword on the primary IDE bus 13 (FIG. 1). This dataword is then propagated on to the inputs of D flip-flop 73 via the IDE bus 13. This sequence of accessing a dataword and then propagating this dataword to the input of the D flip-flop 73 occurs during the period of time when the PRI_IORD signal is at a low logic level.

When the I/O pulse at the input of D flip-flop 75 goes low, the complimentary output of D flip-flop 75 will go high at the next rising edge of the master clock signal, thus making the PRI_IORD signal high and inactive. When the PRI_IORD signal is in the inactive high state, the primary disk drive is disabled from accessing a dataword and placing it on to the primary IDE bus. When the complimentary output goes to the inactive high state, it serves as a clocking signal which is connected to the clock inputs of the D flip-flops 73. Therefore, upon the rising edge of the output of flip-flop 75, a dataword present at the input of the D flip-flops 73 is clocked into a primary CRC circuit 25. Thus, in this manner, the frequency and number of datawords which are transmitted to the CRC circuit 25 are controlled.

After a dataword has been transferred to the primary CRC circuit 25, the CRC calculation that is subsequently performed on the dataword and the storage of the results must also be synchronized. As will be described in further detail below, synchronization circuit 14 clocks the newly calculated checksum value into the accumulation register 29 one clock cycle after the dataword is clocked into the CRC circuit 25. When the new checksum value is clocked into the accumulation register 29 it is thereby stored in the register and fed back to the CRC circuit 25 where it is used to perform a CRC/checksum calculation on the next dataword which is clocked into the CRC circuit 25. The storing of a checksum value into the accumulation register 29, one clock cycle after the CRC circuit 25 has received a dataword, ensures that the new checksum value will be fed back to the CRC circuit 25 before or at the same time that the next dataword arrives at the CRC circuit 25. In this fashion, the arrival of new datawords, the storage of new CRC values and the feedback of these CRC values to the CRC circuit 25 to perform the next CRC calculation, are synchronized.

As mentioned above, the I/O read circuit 74 generates an I/O pulse train of specified pulse width and frequency which controls the frequency and number of datawords transmitted to the input D flip-flops 73. This I/O pulse train is input to the D input of the D flip-flop 75. Therefore, when the I/O pulse is a logic level high, the complimentary output, $\overline{Q}$_75, is a logic level low which serves as the PRI_IORD signal for accessing a dataword and placing the dataword onto the primary IDE bus where it is then propagated to the inputs of the D flip-flop 73. As can be seen from FIG. 4, the complimentary $\overline{Q}$ output of the D flip-flop 75 is also connected to the input of AND gate 79. The Q output of D flip-flop 75 is connected to the input of the D flip-flop 77 which has a Q output connected to the second input of the AND gate 79. The output of AND gate 79 is connected to the input of a D flip-flop 81 which has a Q output that functions as the clock signal for the accumulation registers 29. The method in which this circuitry synchronizes the generation of each CRC value and its subsequent storage in the accumulation registers 29 is described in further detail with respect to FIG. 5 below.

Figure 5:
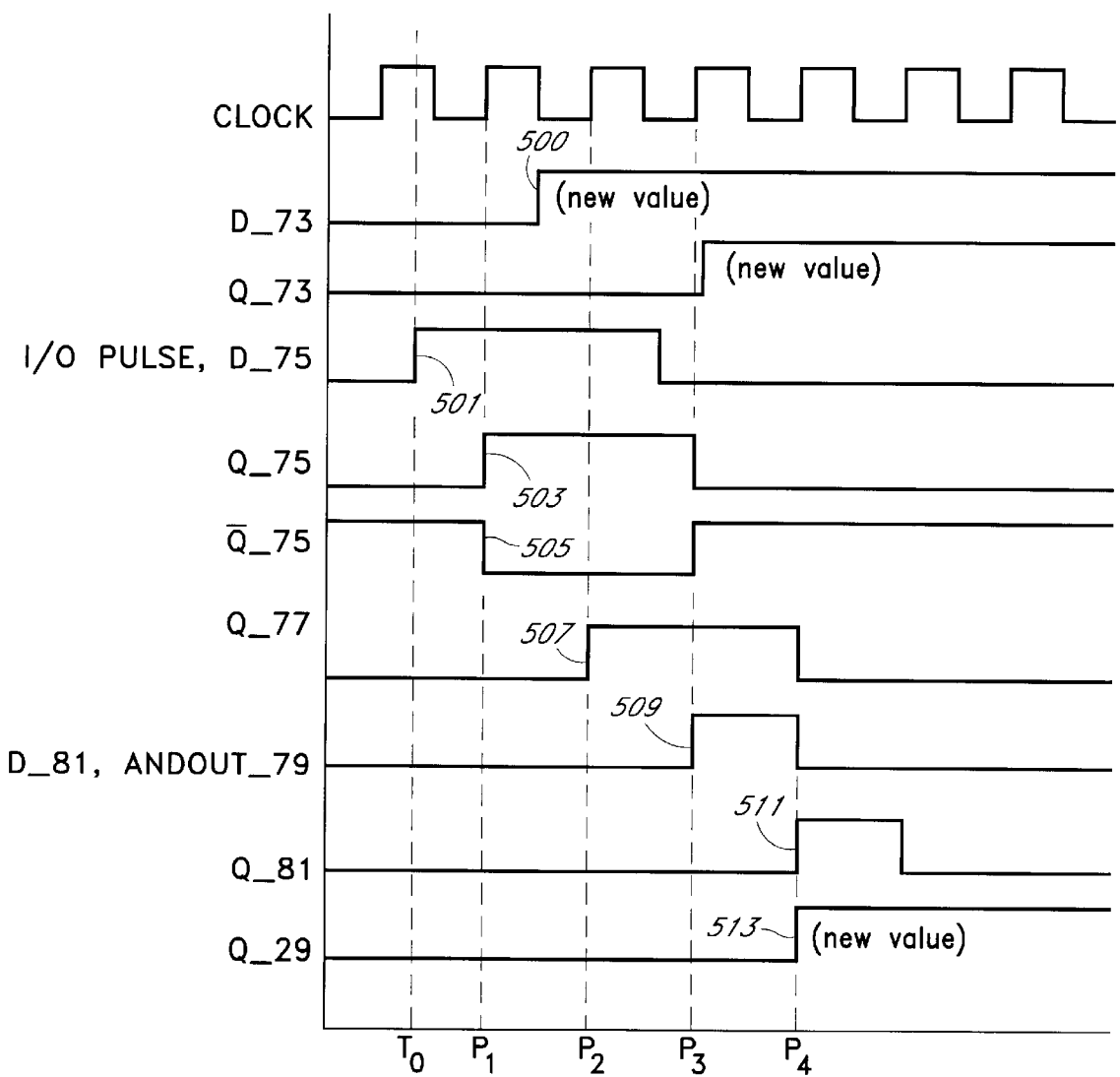
FIG. 5 is a timing diagram of the synchronization control signals that are propagated through the synchronization circuit of FIG. 4.

Referring to FIG. 5, a dataword designated as signal D_73 is transmitted to the input of the D flip-flop 73. As mentioned above, in one embodiment, the dataword is a 16-bit dataword and, therefore, there are 16 parallel D flip-flops 73 for receiving each bit of the dataword. It should be noted that the signal represented by D_73 in FIG. 5 is only one bit of the 16-bit dataword. A corresponding data bit signal is simultaneously received at each of the other fifteen D flip-flops 73. As shown at 500 in FIG. 5, this D_73 bit value changes from low to high at a time before $P_3$. However, this bit value is arbitrarily selected for purposes of illustration. The new value received at the input D_73 may be a low value as indicated by the dashed lines associated with the signal D_73. Similarly, the dashed lines associated with signals Q_73 and Q_29 correspond to a low value at the input D_73.

It is seen that at 501, after the primary drive has transmitted a dataword to the input of the D flip-flop 73, the I/O pulse will go to a logic high state at a time $T_0$. At the rising edge of the next clock pulse, P1, shown at 503, the output Q_75 will go to a logic level high and the complimentary output $\overline{Q}$_75 will go low at 505. When Q_75 goes high, there will be a logic level high signal at the input of D Flip-flop 77. However, as seen at 507, because of the delay in D flip-flop 77 the output Q_77 will not go high until one clock cycle later at time P2. Therefore, there is a period of time equal to one clock cycle between time P3 and P4, in which both inputs to AND gate 79 are high, thereby producing a high at the output of AND gate 79 at 509 for such time period.

Because the output of AND gate 79 is connected to the input of D flip-flop 81, it is seen at 511 that on the rising edge of the next clock cycle, at a time P4, the output Q_81 will go high thereby clocking the accumulation registers 29 as seen at 513. Accordingly, the new CRC/checksum value is stored in the accumulation registers 29 and thereafter fed back to the CRC/checksum circuit 25 where it is then ready to be logically combined with the next dataword to arrive at the CRC circuit 25.

As can be seen from FIG. 5, the accumulation registers 29/31 are not clocked by Q_81 until at least one clock cycle after the I/O pulse signal from the I/O read circuit 74 has gone low. As described above, by the time the I/O pulse signal goes low, a dataword has been transmitted by the primary disk drive 17, via the primary IDE bus 13, to the input of the D flip-flop 73. The pulse width of the I/O pulse signal generated by the I/O read circuit ensures that this will be the case. When the I/O read circuit 74 receives an interrupt signal, e.g. PRI_IRQ, it will cease outputting the I/O pulse signal, thereby turning the complimentary output, $\overline{Q}$, of D flip-flop 75 to a high logic level and consequently terminating any further data accesses by the primary disk drive 17. The design of the I/O read circuit 74 may be one of numerous designs for such circuits which are well-known in the art and need not be further discussed here.

As can also be seen from FIG. 5, the accumulation registers 29 are clocked by signal Q_81 one clock cycle after the $\overline{Q}$ complimentary output of D flip-flop 75 has clocked the dataword present at the input of D flip-flop 73 into the CRC/checksum circuit 25. Therefore, each new CRC/checksum value is stored in the accumulation register 29 before or at the same time that the next dataword is clocked into the CRC/checksum circuit 25, where the new CRC value is used to calculate a new CRC value for the next dataword. In this manner, the synchronization circuit synchronizes the transmission of each dataword with the CRC calculations performed on each dataword. The synchronization circuit also synchronizes the subsequent storage and feedback of the calculated value to the CRC circuit 25. In one embodiment, each CRC/checksum value is a 16-bit dataword, therefore, the accumulation registers 29 comprise 16 parallel D flip-flops, each used for storing a bit of the 16-bit dataword. Each D flip-flop 29 has a clock input which simultaneously receives clock signal Q_81 as described above.

The invention, as described above, provides an IDE controller which can substantially simultaneously access data from two mirrored disks, in a parallel fashion, substantially simultaneously perform CRC/checksum calculations on data received from each mirrored disk, and compare the CRC/checksum values for each in order to verify data integrity. The present invention provides for greater reliability, throughput and faster data access by a computer system.

The invention may be embodied in other specific forms without departing from its spirit or essential characteristic. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A method of checking data integrity in a mirrored disk configuration for a computer system, comprising:
   transmitting primary data from a primary storage device to a primary CRC circuit;
   transmitting secondary data from a secondary storage device to a secondary CRC circuit, wherein the primary data and the secondary data are transmitted to their respective CRC circuits concurrently;
   generating a primary CRC value;
   generating a secondary CRC value, wherein the primary and secondary CRC values are generated concurrently; and
   comparing the primary CRC value with the secondary CRC value in order to generate a compare value.

2. The method of claim 1 further comprising:
   receiving the primary and secondary data in a host interface; and
   transmitting the primary and secondary data to a host central processor unit, if the primary CRC value is identical to the secondary CRC value, wherein the host interface includes a buffer for storing the primary and secondary data.

3. The method of claim 1 further comprising:
   storing the primary CRC value in primary accumulation registers; and
   storing the secondary CRC value in secondary accumulation registers.

4. The method of claim 3 further comprising:
   transmitting the primary CRC value stored in the primary accumulation registers to the primary CRC circuit, wherein the primary CRC value is a feedback signal connected to the primary CRC circuit and is used to perform the operation on a next set of primary data; and
   transmitting the secondary CRC value stored in the secondary accumulation registers to the secondary CRC circuit, wherein the secondary CRC value is a feedback signal connected to the secondary CRC circuit and is used to perform the operation on a next set of secondary data.

5. The method of claim 4 further comprising:
   synchronizing the transfer of the primary data to the primary CRC circuit with the feedback of primary CRC values to the primary CRC circuit; and synchronizing the transfer of the secondary data to the secondary CRC circuit with the feedback of secondary CRC values to the secondary CRC circuit.

6. The method of claim 1 further comprising the act of storing the compare value, wherein if the primary CRC value is identical to the secondary CRC value, the compare value is "true," otherwise, the compare value is "false."

7. The method of claim 6 wherein said "true" compare value is a high logic level and said "false" value is a low logic level.

8. The method of claim 6 further comprising:
Synchronizing the storage of the compare value into the status register, such that the compare value is stored only after the transmission of the primary and secondary data to their respective CRC circuits has been completed.

9. The method of claim 7 further comprising reading the compare value stored in the status register in order to determine the integrity of the primary and secondary data.

10. A method of checking the integrity of data stored in a redundant storage system used in a computer system, comprising:
transmitting primary datawords from a primary storage device on a primary channel to a primary CRC circuit;
transmitting secondary datawords from a secondary storage device on a secondary channel to a secondary CRC circuit wherein each primary dataword is transmitted concurrently with a corresponding secondary dataword;
generating a new primary CRC value for each primary dataword;
generating a secondary CRC value for each secondary dataword;
comparing each primary CRC value with a corresponding secondary CRC value; and
generating a compare value of "true" if each primary CRC value is identical to the corresponding secondary CRC value, otherwise, generating a compare value of "false."

11. The method of claim 10 further comprising:
storing each primary CRC value into primary accumulation registers; and
storing each secondary CRC value into secondary accumulation registers.

12. The method of claim 11 wherein:
the primary CRC circuit includes a first input, coupled to the primary channel, for receiving a primary dataword, and a second input, coupled to an output of the primary accumulation registers, for receiving a primary CRC value that was calculated for a previous primary dataword;
the secondary CRC circuit includes a first input, coupled to the secondary channel, for receiving a secondary dataword, and a second input, coupled to an output of the secondary accumulation registers, for receiving a secondary CRC value that was calculated for a previous secondary dataword;
wherein the primary CRC value is a feedback signal connected to the second input of the primary CRC circuit and is used to perform the operation on the primary dataword; and
wherein the secondary CRC value is a feedback signal connected to the second input of the secondary CRC circuit and is used to perform the operation on the secondary dataword.

13. The method of claim 12 further comprising:
synchronizing the transfer of primary datawords to the primary CRC circuit with the feedback of primary CRC values to the primary CRC circuit; and
synchronizing the transfer of secondary datawords to the secondary CRC circuit with the feedback of secondary CRC values to the secondary CRC circuit.

14. The method of claim 10 further comprising:
storing the compare value in a storage register; and
synchronizing the storing of the compare value such that the compare value is stored only after a specified number of primary and secondary datawords have been transmitted to their respective CRC circuits and a last primary and secondary CRC value has been compared.

15. The method of claim 13 wherein:
the act of synchronizing the transfer of primary datawords comprises:
receiving a primary dataword from a primary IDE device;
transmitting the primary dataword to the primary CRC circuit at a designated time;
generating a primary I/O read signal;
triggering the storage of a primary CRC value into the primary accumulation registers at a designated time after the primary dataword has been received by the primary CRC circuit, wherein the designated times for receiving the primary dataword and transmitting the primary CRC value to the primary accumulation registers is controlled by the primary I/O read signal; and
the act of synchronizing the transfer of secondary datawords comprises:
receiving a secondary dataword from a secondary IDE device;
transmitting the secondary dataword to the secondary CRC circuit
at a designated time;
generating a secondary I/O read signal; and
triggering the storage of a secondary CRC value into the secondary accumulation registers at a designated time after the secondary dataword has been received by the secondary CRC circuit, wherein the designated times for receiving the secondary dataword and transmitting the secondary CRC value to the secondary accumulation registers is controlled by the secondary I/O read signal.

16. The method of claim 14 wherein the act of synchronizing the storage of the compare value comprises:
receiving a primary interrupt signal from the primary channel;
generating a first synchronization signal in response to receiving the primary interrupt signal;
receiving a secondary interrupt signal from the secondary channel;
generating a second synchronization signal in response to receiving the secondary interrupt signal; and
transmitting the first and second synchronization signals to a synchronization circuit; and
triggering the storage of the compare value only after the primary and secondary synchronization signals have both been received by the synchronization circuit.

17. The method of claim 13 wherein:
the act of synchronizing the transfer of primary datawords comprises the steps of:
transmitting a primary dataword to a primary set of data registers;

transmitting the primary dataword from the primary set of data registers to the primary CRC circuit on a first rising edge of a master clock signal; and storing a primary CRC value in the primary accumulation registers on a second rising edge of the master clock signal, wherein the second rising edge follows at least one clock cycle after the first rising edge and the step of generating the primary CRC value is performed during the time period between the first rising edge and the second rising edge; and the act of synchronizing the transfer of the secondary datawords comprises:

transmitting a secondary dataword to a secondary set of data registers, wherein the transmission of each secondary dataword to the secondary set of data registers occurs concurrently with the transmission of the primary dataword to the primary set of data registers;

transmitting the secondary dataword from the secondary set of data registers to the secondary CRC circuit on a third rising edge of the master clock signal; and storing the secondary CRC value in the secondary accumulation registers on a fourth rising edge of the master clock signal, wherein the fourth rising edge follows at least one clock cycle after the third rising edge and the step of generating the secondary CRC value is performed during the time period between the third rising edge and the fourth rising edge.

18. The method of claim 17 wherein the first and third rising edges occur simultaneously.

19. The method of claim 17 wherein the third rising edge occurs before the first rising edge.

20. The method of claim 17 wherein the act of synchronizing the storage of the compare value comprises:

transmitting a primary interrupt signal to a primary synchronization circuit after the primary device has transmitted a specified number of primary datawords to the primary CRC circuit;

transmitting a secondary interrupt signal to a secondary synchronization circuit after the secondary device has transmitted a specified number of secondary datawords to the secondary CRC circuit;

determining when the primary interrupt signal and the secondary interrupt signal have both been transmitted to their respective synchronization circuits; and transmitting a trigger signal to a status register after both the primary and secondary interrupt signals have been transmitted to their respective synchronization circuits, thereby triggering the status register to store the compare value.

21. A method of checking data integrity in a mirrored disk configuration for a computer system, comprising:

transmitting primary data from a primary storage device to a primary CRC circuit;

transmitting secondary data from a secondary storage device to a secondary CRC circuit, wherein the primary data and the secondary data are transmitted to their respective CRC circuits concurrently;

concurrently generating a primary CRC value and a secondary CRC value;

comparing the primary CRC value with the secondary CRC value in order to generate a compare value;

storing the compare value, wherein if the primary CRC value is identical to the secondary CRC value, the compare value is "true," otherwise, the compare value is "false;" and synchronizing the storage of the compare value into the status register, such that the compare value is stored only after the transmission of the primary and secondary data to their respective CRC circuits has been completed.

* * * * *